United States Patent [19]

Dorer, Jr.

[11] 4,036,772
[45] July 19, 1977

[54] ESTERS MADE FROM THE REACTION PRODUCT OF LOW MOLECULAR WEIGHT ETHYLENICALLY UNSATURATED ACYLATING AGENTS AND OXIDIZED ETHYLENE-PROPYLENE INTERPOLYMERS

[75] Inventor: Casper John Dorer, Jr., Lyndhurst, Ohio

[73] Assignee: The Lubrizol Corporation, Wickliffe, Ohio

[21] Appl. No.: 554,362

[22] Filed: Mar. 3, 1975

[51] Int. Cl.² ................................................ C10M 1/24
[52] U.S. Cl. ...................... 252/56 R; 44/62; 44/70; 260/878 R
[58] Field of Search ............ 260/78.4 D, 878 R; 44/62, 66, 70; 252/56 R

[56] References Cited

U.S. PATENT DOCUMENTS

| | | | |
|---|---|---|---|
| 3,316,177 | 4/1967 | Dorer, Jr. | 44/62 |
| 3,374,073 | 3/1968 | Gergel | 44/62 |
| 3,542,678 | 11/1970 | Bork | 44/66 |
| 3,687,905 | 8/1972 | Dorer | 260/78.4 D |
| 3,756,954 | 9/1973 | Abbott et al. | 44/62 |

*Primary Examiner*—Daniel E. Wyman
*Assistant Examiner*—Mrs. Y. Harris-Smith
*Attorney, Agent, or Firm*—James W. Adams, Jr.; Daniel N. Hall

[57] ABSTRACT

Esters made from (A) high molecular weight carboxylic acid reagents derived from low molecular weight ethylenically unsaturated carboxylic acid reagents and oxidized ethylene-propylene interpolymers and (B) mono- or polyhydric alcohols are useful in lubricant compositions and normally liquid fuel compositions as viscosity improving agents and sludge dispersants. Esters wherein the low molecular weight reagent is maleic anhydride and the alcohol is a polyol such as pentaerythritol are particularly useful.

28 Claims, No Drawings

ESTERS MADE FROM THE REACTION PRODUCT OF LOW MOLECULAR WEIGHT ETHYLENICALLY UNSATURATED ACYLATING AGENTS AND OXIDIZED ETHYLENE-PROPYLENE INTERPOLYMERS

BACKGROUND OF THE INVENTION

1. Field of the Invention

This invention relates to additives for lubricants and normally liquid fuels. More particularly it relates to additive compositions which are formed by esterifying an alcohol with a high molecular weight carboxylic acid reagent derived from an oxidized, degraded ethylene-propylene interpolymer and a low molecular weight ethylenically unsaturated carboxylic acid reagent. The invention also pertains to lubricant compositions, normally liquid fuel compositions and additive concentrate compositions containing these additive esters.

2. General Background

The improvement of performance properties of lubricants and normally liquid fuels by the addition thereto of certain materials known as additives is well known in the art. See for example, Smallheer and Smith "Lubricant Additives" published by Lezius-Hiles Corporation, Cleveland, Ohio, and Gruse "Motor Oils" published by the Reinhold Publishing Corporation of the New York, particularly pages 160–203. Specifically, it is well known that a lubricating oil's viscosity-temperature interrelationship can be improved by addition to the oil of a viscosity improving agent. Similarly, it is well known that the ability of an oil or a liquid fuel to disperse the sludge formed in it can be improved by addition to the oil or fuel of certain relatively high molecular weight organo-nitrogen additives. Still further, it is known that the VI and dispersant functions of such additives can be combined in a single molecule composition. One class of such materials which are nitrogen-containing polyacrylates and polymethacrylates are sold by the Rohm and Haas Company of Philadelphia, Pennsylvania, under the trade name "Acryloids".

Increasing attention to the problems of air pollution and more specifically those problems arising from combustion of organo-nitrogen compounds has led to a search for effective viscocity improving and sludge dispersing agents in which only carbon, hydrogen and oxygen are present in substantial amounts. One such class of sludge dispersing agents comprising certain succinate esters is disclosed in U.S. Pat. Nos. 3,331,776, 3,346,354 and 3,381,011. Graft copolymers made by reacting unsaturated carboxylic acid esters of alkane diols are also known to be effective carbon-, hydrogen- and oxygen-containing dispersants and VI improvers. See, for example, U.S. Pat. No. 3,687,849. The present invention is directed to a third type of multifunctional viscosity improving, sludge dispersing and cold flow improving additives.

3. Prior Art Patents

In addition to the hereinabove-noted patents, the following U.S. Patents provide background for the present invention. U.S. Pat. No. 3,388,067 discloses lubricant compostions containing hydroxylated, degraded ethylene-alphaolefin interpolymers. U.S. Pat. Nos. 3,389,087 and 3,551,335 describe oil compositions containing ethylene-alpha-olefin copolymers with varying distinguishing characteristics such as crystallinity and specified chain conformations. U.S. Pat. No. 3,769,216 discloses lubricant compositions containing additives derived from degraded ehylene propylene copolymers-alkylene polyamines reactions. Finally, U.S. Pat. No. 3,316,177 discloses luricating oils containing polyamine salts of the reaction product of maleic anhydride and oxidized, degraded ethylene-propylene interpolymers.

SUMMARY OF THE INVENTION

The multifunctional additives of the present invention comprise at least one ester made from:

A. at least one high molecular weight carboxylic acid reagent prepared by reaction of (1) a low molecular weight, ethylenically unsaturated carboxylic acid reagent with (2) an oxidized, degraded ethylene-propylene interpolymer having a molecular weight of at least 700 and being obtained by heating a higher molecular weight ethylene-propylene interpolymer at a temperature of at least 100° C. in the presence of oxygen to cause a reduction of at least 5% in the molecular weight of said interpolymer, and B. at least one mono- or polyhydric alcohol of the formula $$R(OH)_n$$

wherein R is a hydrocarbon-based radical of one to about forty carbon atoms and n is one to about six.

DETAILED DESCRIPTION OF THE INVENTION

A. The low molecular weight, ehthylenically unsaturated carboxylic acid reagents:

In this specification and the appended claims, the term "carboxylic acid reagent" (whether of high or low molecular weight) is meant to embrace the free carboxylic acids described hereinbelow, and in addition esters of such acids with low molecular weight $C_1$ to $C_7$ monohydric alcohols (e.g., methanol, ethanol, phenol, etc.), acid halides of such acids (e.g., chlorides, bromides, etc.), amides of such acids in which the amido portion contains from one to ten carbon atoms (e.g., methyl amides, dimethyl amides, 4-morpholino-amide, etc.), salts of such acids with ammonia or amines having from one to ten carbon atoms (e.g., morpholine, methyl amine, N-methyl octyl amine, trimethyl amine, N-3-amino propyl morpholine, etc.), anhydrides of such acids, and Group I and Group II metal salts of such acids (sodium salts, calcium salts, etc.). The preferred carboxylic acid reagents are free acids and anhydrides thereof.

Generally low molecular weight reagents (a) are mono- or polycarboxylic acid reagents containing a total of up to about 20 carbon atoms in the acyl moiety and up to about 6 carboxyl functions. Normally, they will contain from one to three carboxyl functions and one to three ethylenically unsaturated carbon-to-carbon bonds. Preferably, they contain one ethylenically unsaturated carbon-to-carbon bond. In an especially preferred aspect, there is an ethylenically unsaturated carbon-to-carbon bond alpha, beta to at least one of the carboxyl groups. The preferred acid reagents (A) used in this invention can be represented by the formula $$R'(COOH)_m$$

wherein R' is a hydrocarbon-based group of up to twenty carbon atoms containing ethylenic unsaturations and m is between one and about six.

The following are illustrative examples of the low molecular weight, unsaturated carboxylic reagents (A) used in forming the compositions of the present invention: acrylic acid and esters thereof, methacrylic acid, and amides thereof and its alkali metal salts, crotonic acid, isocrontonic acid, tiglic acid, angelic acid, 1,4-hexadienoic acid, oleic acid and esters thereof, elaidic acid, linoleic acid and its ammonium salts, α-eleostearic acid, β-eleostearic acid, α-linolenic acid, erucic acid, maleic acid, and amides thereof, fumaric acid, itaconic acid, cinnamic acid and Group I salts theeof, 2-,3-, or 4-carboxy-cinnamic acid, 1-methallylsuccinic acid, aconite acid, ethoxy-methylene malonic acid (i.e., $C_2H_5OCH=C(CO_2H)_2$), cinnamalmalonic acid (i.e., $C_6H_5CH=CHCH=C(CO_2H)_2$) allylmalonic acid (i.e., $CH_2=CHCH_2CH(CO_2H)_2$), chloromaleic acid, bromomaleic acid, 3-cyclohexene-1,2-dicarboxylic acid, 4-cyclohexene-1,2-dicarboxylic acid and its anhydrid, 1-cyclohexane-1-carboxylic acid, 2,6-cyclohexadien-1,1-dicarboxylic acid, 2-nitrocinnamic acid, vinylacetic acid, 2-chloro-2-butenoic acid, 4-bromo-2-butenoic acid, glutaconic acid, teraconic acid, 5-allyl-2,3-dimethoxybenzoic acid, 2-pentene-1,3,5-tricarboxylic acid, and the like. For reasons of availability, ease of reaction and performance of esters produced therefrom, acrylic acid reagents, methacrylic acid reagents and maleic acid reagents are particularly preferred low molecular weight, ethylenically unsaturated reagents. Maleic anhydride is an especially preferred carboxylic acid reagent.

A. The oxidized, degraded ethylene propylene interpolymers.

The oxidized, degraded interpolymers (hereinafter sometimes referred to merely as "the degraded interpolymers") used in preparing the compositions of this invention are derived principally from ethylene and propylene. They may include minor amounts, i.e., up to about ten molar percent based on the molar amounts of monomeric ethylene and propylene units in the interpolymer, or polymerized units derived from other monomers. Examples of such other monomers include polymerizable mono-olefins having at least four carbon atoms such as 1-butene, 1-pentene, 2-butene, 3-hexene, 4-methyl-1-pentene, 1-decene, 1-nonene, 2-methylpropene, and 1-dodecene. They also include polymerizable polyenes; e.g., conjugated polyenes, for example, butadiene, isoprene, piperylene, 1,3-hexadiene, 1,3-octadiene, 2,4-decadiene, etc., and non-conjugated polyenes such as 3,3-dimethyl-1,5-hexadiene, 1,9-decadiene, dicyclopentadiene, 1,19-eicosadiene, 1,4-pentadiene, 1,5-hexadiene, methylene norbornene, vinyl cyclohexane, etc. These non-conjugated dienes are especially useful in the interpolymer. For the most part, such other monomers contain about four to ten carbon atoms although they may contain as many as twenty-five carbon atoms.

Interpolymers containing about 20–70 mole percent of polymerized propylene, about 30–80 mole percent of polymerized ethylene, and up to about ten mole percent of another polymerized olefin are especially useful and those containing about 25–50 mole percent of polymerized propylene, about 50–75 mole percent of polymerized ethylene and about 1–10 mole percent of a polymerized non-conjugated diene are preferred.

The interpolymers from which the degraded polymers of the above process are derived usually have molecular weights of at least about 50,000. They may have molecular weights of as high as 800,000 or higher. The interpolymers having molecular weights of about 50,000 to about 300,000 are especially useful. These molecular weights are determined by gel permeation chromatography (g.p.c.) or membrane osmometry (m.o.).

The degraded interpolymers may be prepared conveniently by heating an interpolymer such as illustrated above at a temperature of at least about 100° C. in the presence of oxygen or air so as to cause the degradation of the interpolymer. Preferably, the degradation is carried out between about 130° C. and about 350° C. More preferably, the maximum degradation temperature is about 200° C. and the minimum, about 125° C. Such degradation is characterized by a substantial reduction of the molecular weight of the interpolymer. Tjhe mechanism by which the interpolymer is degraded is not precisely known; nor is the chemical composition of the degraded product. It is known, however, from infrared analysis that the product contains some oxygen in the form of carboxylic acid, ester and carbonyl groups. A degraded interpolymer having a molecular weight of at least about 700. preferably of at least 1,000, (as measured by vapor pressure osmometry — v.p.o.) and which has been degraded to the extent that its molecular weight is at least about 5% (preferably at least 10%; more preferably, at least 50%) less than the molecular weight of the interpolymer before degradation (as measured by g.p.c.) is useful for the purposes of this invention. Degraded interpolymers having a molecular weight of 2,000–8,000 (v.p.o.) or as high as about 20,000 to about 100,000 (g.p.c.) are preferred. Often it is convenient to characterize the degraded interpolymer by its ability to thicken an oil solution. The degraded interpolymers useful in this invention exhibit viscosities at 210° F. in the range of about 800 to about 8,000 S.U.S. when 12% (by weight on the total mixture) is placed in an oil of about 100 S.U.S. Preferably they exhibit a minimum viscosity of about 4,500 S.U.S. and a maximum viscosity of about 5,000 S.U.S. when placed in such an oil at the 12% level.

The oxidized, degraded interpolymer can be prepared by heating a suitable interpolymer in the presence of oxygen or air (preferably in the presence of a substantially inert, normally liquid solvent/diluent) until the desired degradation is achieved. In lieu of oxygen or air, a mixture of oxygen and an inert gas such as nitrogen or carbon dioxide can be used. The inert gas thus functions as a carrier of oxygen and often provides a convenient means of introducing oxygen into the reaction mixture. Usually an inert solvent/diluent is present in reaction mixture, but its presence is not essential to the invention.

The oxygen or air may be introduced by bubbling it through the polymer (or solution thereof), particularly if it is not highly viscous. However, it is frequently preferred to merely blow air over the surface of the polymer (or solution thereof) if it is highly viscous while subjecting the polymer to vigorous shearing agitation. A combination of both techniques can also be used.

Inert solvent/diluents useful as a reaction medium in preparing the solution or dispersions of the interpolymer are preferably substantially inert liquid hydrocarbons such as naphtha, hexane, cyclohexane, dodecane, mineral oil, biphenyl, chlorobenzene, xylene or toluene.

Likewise, the reaction medium may be an ether, halogenated hydrocarbon, and the like such as diphenyl ether and chlorobenzene. Obviously, mixtures of any of the foregoing may be used as a reaction medium. The amount of the reaction medium to be used is not critical and it need not be used at all. When it is used, it results in a highly fluid dispersion or solution of the interpolymer. Such reaction mixture usually contains about 60-95% solvent/diluent.

It is preferable to include a small amount (about 0.01 to about 1%) of a color inhibitor in the degradation reaction mixture. Amines are especially useful color inhibitors particularly tertiary $C_{8-20}$ alkyl primary amines.

Preferably, the hereinbefore described degraded ethylene propylene interpolymer (A) and low molecular weight unsaturated carboxylic acid reagents (A) are reacted at a temperature of at least 80° C. to about 300° C. to form the desired high molecular weight intermediate. Higher temperatures, however, can be used in this reaction provided that they do not exceed the decomposition temperature of any component of the reaction mixture. The reaction temperature is normally within the range of about 100° C. to about 250° C.

The reaction of (A) and (A) can be carried out in the presence of substantially inert, normally liquid solvent/diluent such as those described hereinbefore, for example, xylene benzene, naphtha, chlorobenzene, nitrobenzene, textile spirits diphenyl ether, mineral and synthetic oils and the like. Mineral or synthetic oils are especially preferred solvent/diluents for this reaction.

The reaction of (A) and (A) is often carried out in the presence of an organic free radical catalyst such as di-(tertiarybutyl) peroxide, azoisobutyronitrile and the like. When such a catalyst is used, it is normally used in an amount of 0.01-0.5% of the reaction mixture, preferably 0.02-0.1 weight percent of the reaction mixture.

To obtain desired high molecular weight carboxylic acid intermediates, about 0.1-10 parts preferably, about 0.5-5.0 parts, of the low molecular weight unsaturated carboxylic acid reagent is reacted with about 99.1 to about 90 parts, preferably about 99.5 to about 95 parts of the ethylene-propylene interpolymer. Especially preferred ratios are about 0.75-1.25 parts (A) to about 99.25-98.75 parts (A). The reaction of (A) and (A) normally is complete in about 0.1 to 60 hours depending on reaction temperature, amount of reactants and other variables obvious to those skilled in the art.

The desired reaction product, i.e., the high molecular weight carboxylic acid reagent (A), can be recovered from any inert solvent/diluent present by techniques well-known to those skilled in the art; for example, precipitation, filtration, distillation, extraction and the like. In many instances, however, it does not need to be recovered and can be carried on with all or a portion of the inert solvent/diluent to the next stage of reaction, i.e., esterification with the alcohol.

B. The mono- and polyhydric alcohols.

The esters of this invention are made from the hereinabove described high molecular weight carboxylic acid reagent (A) and at least one mono- or polyhydric alcohols of the formula $R(OH)_n$ wherein R is a hydrocarbon-based group of one to about forty carbon atoms and n is one to about six. As used herein and in the appended claims, the term "hydrocarbon-based group" denotes a group having a carbon atom directly attached to the remainder of the molecule and having predominantly hydrocarbon character within the context of this invention. Such groups include the following:

1. Hydrocarbon groups, that is, aliphatic (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art; examples include (in addition to those noted hereinbefore) pentyl, neopentyl, cyclopentyl, etc., betaphenylethyl, phenylene, anthryl, tolyl, xylyl, decalinyl

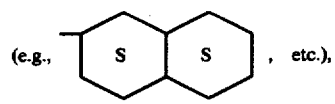

tetrahydronaphthyl and so forth.

2. Substituted hydrocarbon groups, that is, groups containing non-hydrocarbon substituents which, in the context of this invention, do not alter the predominantly hydrocarbon character of the group. Those skilled in the art will be aware of suitable substituents such as:

pendant ether groups (especially hydrocarbyloxy and particularly alkoxy groups of up to ten carbon atoms)
nitro
cyano
fluoro, chloro, bromo
pendant thioether groups (especially $C_{1-10}$ alkyl thioethers such as methylmercapto, butyl-mercapto, etc.) pendant oxo groups

pendant hydrocarbyl sulfonyl groups ($-SO_2R'$ where R' is a $C_{1-10}$ hydrocarbyl group)
carboxyl hydrocarbyl (e.g., $-C(O)OR'$, R' being as above)
oxycarbo-hydrocarbyl (e.g., $-O(O)CR'$, R' being as above)
pendant sulfinyl groups ($-S(O)R'$, R' being as above)
Other such non-hydrocarbyl substituents will be apparent to those skilled in the art.

3. Hetero groups, that is, groups which, while predominantly hydrocarbon in character within the context of this invention, contain atoms other than carbon present in a chain or ring otherwise composed of carbon atoms. Suitable hetero atoms will be apparent to those skilled in the art and include, for example, oxygen, sulfur (in both its oxidized and unoxidized forms) phosphorus and nitrogen. Such hetero groups include, for example, furyl, thienyl, pyranyl, pyrrolyl, imidazolyl, pyridyl, pyrazolyl, pyrazinyl, indolyl, peperidyl, piperazinyl, morpholinyl, morpholino, and so forth.

In general, no more than about three substituents or hetero atoms, and perferably no more than one, will be present for each ten carbon atoms in the hydrocarbon-based radical.

The term "aliphatic-based" has an analogous meaning with respect to aliphatic groups.

The monohydric and polyhydric alcohols (B) can be aliphatic or alicyclic alcohols or aromatic hydroxy compounds such as phenols and naphthols. Illustrative of the latter are the following: phenol, beta-naphthol, alpha-naphthol, cresol, resorcinol, catechol, pp'-dihydroxy biphenol, 2-chlorophenol, 2,4-dibutylphenol, hydroguinane propylene tetramer substituted phenol, didodecyl phenol, 4,4'-methylene bisphenol, alpha-decyl, alpha-naphthol, beta-naphthol, polyisobutene (molecular weight 1,000) substituted phenol, the condensation product of heptylphenol with 0.5 mole of formaldehyde, the condensation product of octylphenol with acetone, di(hydroxy phenol) sulfide, di(hydroxy phenyl) di-sulfide, 4-cyclohexyl phenol and the like.

The polyhydric aliphatic and alicyclic alcohols useful as reactants (b) can be quite diverse and include those polyhydric alcohols disclosed in U.S. Pat. Nos. 3,331,776, 3,346,353; and 3,381,022 which are incorporated herein by reference for their disclosures relating to polyols. Among the suitable polyhydric alcohols are the alkylene glycols and the polyalkylene glycols wherein the alkylene groups have up to about seven carbon atoms and up to about twenty alkylene groups; cycoaliphatic alcohols; aromatic hydrocarbon-substituted alcohols; and various other substituted polyhydric alcohols including mixtures of two or more of any of these alcohols. Specific examples of the polyhydric alcohols contemplated by this invention are ethylene glycol, propylene glycol, trimethylene glycol, butylene glycol, diethylene glycol, triethylene glycol, tetraethylene glycol, di-propylene glycol, tripropylene glycol, dibutylene glycol, tributylene glycol, 9,10-dihydroxy stearic acid and its lower alkyl esters such as the ethyl ester, β, β'-dihydroxy-ethylsulfide, 3-chloro-1,2-propanediol, 1,2-butanediol, 2,3-hexanediol, pinacol, 1,4-dihydroxy-2-nitro-butane, p-xyleneglycol, 2-(1-hydroxybutyl)-cyclohexanol, 4-(1,2-dihydroxyl-n-propyl)-cyclohexanol, α-dimethylether of inositol, inositol, 2,2,6,6-tetrakis-(hydroxymethyl)-cyclohexanol, 1,2-dicyclohexyl-1,2-ethanediol, 1,2-di-phenyl-1,2-ethanediol, phenylethylene glycol, 2,3-di-phenyl-2,3-butanediol, dipentaerythritol, and the like.

Preferably, however, reactant (B) will be a polyhydric aliphatic-based alcohol containing at least three hydroxyl groups and up to about 12 aliphatic carbon atoms. In addition, to those of the above identified alcohols which fall within this preferred class, other alcohols representative thereof are pantothenyl alcohol, N-methylglucamine, alpha-methylglucoside, mannose, maltose, glucose, gluconic acid, and its lower alkyl esters, and the like. Within this preferred group of polyhydric aliphatic-based alcohols, an especially preferred class of alcohols are the polyhydric lower alkanols having from three to six hydroxyl groups and up to seven carbon atoms. This especially preferred class of polyhydric alcohols is illustrated by glycerol, β-hydroxymethyl-2-methyl-propanediol-1,3 (i.e., trimethylolethane or TME), 2-hydroxymethyl-2-ethyl-propanediol-1,3(i.e., trimethylolpropane or TMP), 1,2,4-butanetriol, 1,2,6-hexanetriol, 1,2,3-pentanetriol 1,2,3-hexanetriol 1,2,4-hexanetriol, 1,2,5-hexanetriol 2,3,4-hexanetriol, erythritol, pentaerythritol, arabitol, xylitol, adonitol, sorbitol, mannitol, and the like. Obviously mixtures of the preferred alcohols can also be used as reactant (B).

Monohydric alcohols useful as (B) in making the esters of this invention include (in addition to the hydroxy aromatic compounds set forth hereinbefore) aliphatic and alicyclic alcohols such as methanol, propanol, the various butanols, the various hexenols, the various octanols, decanols, undecenols, dodecanols, and so forth. Mixtures of these with each other as well as with any of the other classes of alcohols discussed hereinabove can be used. Where (B) is a monohydric alcohol, it preferably contains at least eight carbon atoms.

The alcohols (B) can be saturated or ethylenically unsaturated (e.g., alkanols, alkenols, etc.) as well as aromatic. Preferably, however, they are saturated.

The high molecular caboxylic acid reagent (A) agents and alcohols (B) are reacted in amounts such that there is at least about 0.5 equivalent of alcohol (B) and up to about one mole for each equivalent of acid reagent (A).

For purposes of this invention, the number of equivalents of (A) corresponds to the number of carboxyl groups or equivalent functional variations thereof (e.g.,

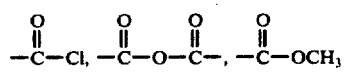

etc.) present in (A). Thus, one mole of a dicarboxylic reagent has two equivalents per mole and a tricarboxylic reagent has three equivalents per mole. Obviously, if a mixture of polycarboxylic acids is employed, the number of equivalents will depend on the particular polycarboxylic acid reagents used and the amount of each. Similarly, the number of equivalents of alcohol is based on the number of alcoholic hydroxyl groups present therein. For example, ethylene glycol and triethylene glycol each have two equivalents per mole; glycerol, three; pentaerythritol, four; and sorbitol, six, and so forth.

It is contemplated that the ester-containing reaction mixture may comprise acidic esters as well as some unreacted (A) agent, particularly if it is to be used in fuels as an anti-rust agent. If, however, the ester is to be used in combination with basic materials and as sulfonate salts and acrylated amines, it is desirable that none or a minimum of unreacted acid groups remain. In this case, at least one equivalent of (B) is used for each equivalent of (A).

There is no critical upper limit on the number of equivalents of alcohol (B) which can be employed in the esterification reaction. Thus, the equivalent ratio of reagent (A) to alcohol (B) can be 1:1.5, 1:2, 1:3, 1:3.2, 1:4, 1:6, 1:7, 1:10, etc. any volatile unreacted alcohols can be removed from the reaction mixture by conventional techniques such as distillation or allowed to remain in the reaction mixture provided they are soluble in the ester-containing first reaction mixture. Their presence, if they are oil-soluble or dispersable at the concentration at which they are present, does not unduly interfere with the use of the final ester compositions. Clearly, however, based on stoichiometric considerations, there is generally no purpose in employing alcohol reactants in amounts such that there is more than about one mole of alcohol (B) for each equivalent of reagent (A) unless the excess alcohol reactant is for the purpose of shifting the reaction equilibrium or serves as a diluent.

If desired, the esterification process can be conducted in the presence of substantially inert organic liquid diluents. The presence of the diluent can facilitate temperature control and the mixing of the reactants. If a diluent is selected which will form an azeotrope with water, the diluent assists in the removal of by-product water. Suitable diluents include, for example, the normally aiphatic, cycloaliphatic, and aromatic hydrocarbons and the corresponding halogenated hydrocarbons, particularly chlorinated hydrocarbons, such as benzene, toluene, xylene, chlorobenzene, hexane, heptane, cyclohexane, mineral oil, mixtures thereof and the like. Ethers, ketones, sulfones, etc., can also be used. Of course, where the alcoholic reactants are liquids at the reaction temperature, the alcohols can serve as diluents and as mentioned above, it may be desirable to employ an excess of alcohol reactant (B) in order that the excess can function as a diluent.

The esterification conditions contemplated by the present invention are those normally used in the preparation of carboxylic acid esters. The reactants are generally heated at a temperature of at least 80° C. up to about 350° C. and preferably at a temperature between about 150° C. and about 250° C. Lower reaction temperature (e.g., about 50° C., preferably about 75° C.) may be employed if reagent (A) is an anhydride or acid halide.

Conventional esterification catalysts may be used to promote the esterification reaction. Illustrative catalysts include sulfuric acid, pyridine hydrochloride, hydrochloric acid, benzene sulfonic acid, p-toluene sulfonic acid, phosphoric acid, and other known esterification catalysts. The catalyst, if present, can be employed in an amount from about 0.01% to about 5% by weight based on the total weight of the reactants. Sometimes it is helpful to blow dry inert gases (e.g., nitrogen) through the reacting materials to assist in the removal of water.

As suggested above, the reagent (A) can be the carboxylic acid per se, the corresponding anydride, the acyl halides, or other conventional acylating forms of carboxylic acids. Generally, the carboxylic acid or its anhydride will be employed. As is obvious to those skilled in the art, a lower alkyl ester could be used as an acylating agent in an ester exchange reaction.

Processes, for preparing carboxylic acid esters of alcohols are well-known and no further description of these conventional esterification conditions suitable for preparing the ester composition of this invention is needed. Further details can be found in Kirk-Othmer "Encyclopedia of Chemical Technology," Volume 8, 2nd Edition, page 313–365 and U.S. Pat. No. 3,381,022 which are hereby incorporated by reference for their relevant disclosures.

The following examples illustrate the esters of this invention and the processes for preparing them. In these examples, as well as elsehwere in these specifications, and the appended claims, all percentages are percentages by weight and all parts are parts by weight, unless explicitly stated to the contrary.

EXAMPLE 1

A mixture of 1700 parts of a low viscosity naphthenic oil, 300 parts of a rubbery terpolymer (in the form of a crumb) of ethylene, propylene and cyclopentadiene, having a Monney viscosity of 80–95 (100° C.) and containing about 45 parts of ethylene, 51 parts of propylene and 3 parts of dicyclopentadiene is heated to 140° C. under nitrogen with vigorous stirring. Five parts of a $C_{12-14}$ tertiary alkyl primary amine mixture is added to inhibit color formation in the solution during degradation. Air is then blown over the reaction mixture at 120°–150° C. for 6.8 hours while it is vigorously stirred. After the first hour, an additional 5 parts of tertiary alkyl primary amine mixture is added. The degraded polymer is heated to 110° C./5mm to remove the color inhibitor.

To the resulting mixture is added 6 parts of maleic anhydride. The mixture is then heated to 180° C. for 4 hours. Vacuum stripping of the product produces only a trace of free maleic anhydride. Determination of the saponification number shows substantial reaction with maleic anhydride occurs and that the desired high molecular weight carboxylic acid reagent is formed.

To 500 parts of the carboxylic acid reagent solution described above is added 3 parts of pentaerythritol and 1 part of concentrated sulfuric acid as a catalyst. The reaction mixture is heated at 170°–180° C. for 3 hours, while water is allowed to evaporate from it. Vacuum stripping and filtration through diatomaceous earth provides an oil solution of the desired product.

EXAMPLE 2

An oil solution containing 500 parts of degraded ethylene-propylene interpolymer is prepared in essentially the same fashion described in Example 1. To this solution is added 12 parts of methyl methacrylate and the mixture is heated for 4 hours at 160°–170° C. to form the desired high molecular weight carboxylic acid reagent. This reaction intermediate is then reacted with 12 parts of glycerol, in essentially the same fashion as described in Example 1, to produce the desired product ester.

EXAMPLE 3

To 1800 parts of ortho-dichlorobenzene at 130° C. is slowly added 157 parts of chopped up ethylene-propylene interpolymer having a molecular weight greater than 200,000 (g.p.c.) and being a random, amorphous polymer. This solution is then blown with air for 4 hours, during which time the temperature rises to 155° C. Samples are taken periodically and the viscosity determined. The inherent viscosity of the mixture varies from a high of 167 at the beginning of the reaction to a low of 0.88 at the end of the reaction. During the last hour of heating, the air stream is replaced with a nitrogen stream to purge the reaction mixture. To the reaction mixture is added 1,000 parts of a neutral paraffinic oil, 3.2 parts of maleic anhydride, and 1.6 parts of di-tertiary butyl peroxide. The mixture is heated to 140° C. for 1 hour, then a total of 621 parts of additional oil is added and the reaction mixture is vacuum stripped to produce as distillate about 900 parts of di-chlorobenzene and, as a residue, an oil solution of the desired high molecular weight carboxylic acid reagent. To 486 parts of this solution is added 50 parts of xylene and 1.2 parts of pentaerythritol and 0.5 parts of sulfuric acid catalyst. The reaction mixture was heated at 110°–120° C. for 2 hours, and then filtered to produce an oil solution of the desired ester.

As previously indicated, the ester compositions of this invention are useful as additives for lubricants, in which they function primarily as viscosity improving agents and sludge dispersants. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, and the like. They can also be used in gas engines, jet aircraft turbines, stationary power engines and turbines and the like. Especially preferred lubricants containing the compositions of this invention are hydrostatic fluids, power steering pump fluids, automatic transmission fluids, transaxle lubricants, gear lubricants, and hydraulic fluids. Other lubricating oil and grease compositions can also benefit from the incorporation therein of the compositions of the present invention.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycolmonether, propylene glycol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-tetraethyl)-silicate, tetra-(p-tert-butylphenyl)silicate, hexyl-(4-methyl-2-pentoxy) disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils (and mixtures of each with each other) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such a solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally, the lubricants of the present invention contain an amount of the composition of this invention sufficient to provide it with viscosity improver and/or sludge-dispersing properties. Normally this amount will be about 0.5 to about 20%, preferably about 1 to about 10% of the total weight of the lubricant. In lubricating oils operated under extremely adverse conditions, such as lubricating oils for marine diesel engines, the reaction products of this invention may be present in amounts of up to about 30% by weight.

The lubricant compositions of the present invention can contain, in addition to the ester compositions of this invention, other additives that are normally used in lubricants. Such additives include, for example, auxiliary detergents of the ash-forming (e.g., neutral and overbased salts or organo acids) and of the ashless type, supplementary viscosity index improving agents, pour point depressants, antifoam agents, extreme pressure agents, rust-inhibiting agents, oxidation- and corrosion-inhibiting agents.

The normally liquid fuel compositions of this invention normally are based on fuels derived from petroleum sources, e.g., normally liquid petroleum distillate fuels, though they may include those produced synthetically by the Fischer-Tropsch and related processes, the processing of organic waste material or the processing of coal, lignite or shale rock. Such fuel compositions have varying boiling ranges, viscosities, cloud and pour points, etc., according to their end use. Among such fuels are those commonly known as gasoline, diesel fuels, kerosene, distillate fuels, heating oils, residual fuels, bunker fuels, etc. The properties of such fuels are well known as shown by ASTM Specification D No. 396-73 and D No. 439-73 available from the American Society for Testing Materials, 1916 Race Street, Philadelphia, Pa. 19103.

The fuel compositions of the present invention can contain about 0.001% to about 5% (based on the weight of the final composition), preferably about 0.001% to about 1% of the above-described ester compositions. The presence of these additive compositions imparts desirable characteristics such as dispersing and particularly with incompletely esterified esters, anti-rust properties to the fuel composition. With heavier distillate and residuel fuels, the fuel's flow properties at low temperature can also be improved. It is believed that this effect is due to the additive's ability to modify wax crystal formation in the fuel.

The fuel compositions of this invention can contain, in addition to the products of the invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, anti-oxidants such as 2,6-di-tertiarybutyl-4-methylphenol, supplementary rust inhibitors, such as alkylated succinic acids and anhydrides, bacteriostatic agents, gum inhibitors, metal deactivators, upper cylinder lubricants, supplementary sludge dispersants and detergents and the like.

The ester compositions of this invention can be added directly to the fuel or lubricant to be treated or they can be diluted with an inert solvent/diluent such as the various oils and normally liquid fuels described in detail hereinabove to form additive concentrates. These concentrates generally contain about 20 to about 90 percent additive composition and can contain in addition any of the above described prior art additives, particularly the aforedescribed ashless dispersants. Obviously, a concentrate normally will employ as the solvent/diluent a liquid which is the same as or soluble in the fuel or lubricant in which it is to be used.

The lubricant and fuel compositions and concentrates of this invention are exemplified by the following:

EXAMPLE A

A gasoline having a Reid vapor pressure of 12 psi and containing 2.7 grams of tetraethyl lead per gallon and 15 parts per million parts of gasoline of the reaction product described in Example 1.

EXAMPLE B

A motor oil graded SAE 10W-30 containing 0.5% of the reaction product described in Example 1 and other conventional additives.

The ester, additive concentrate, lubricant and liquid fuel compositions of this invention have been specifically exemplified hereinabove to aid those skilled in the art in understanding and practicing the invention. Many obvious variations and departures from these specific teaching will be apparent to those of skill in the art based on principles and disclosures herein and in the prior art. Such variations and departures are contemplated as being within the scope of the present invention unless clearly excluded by the appended claims.

What is claimed is:

1. A composition of matter comprising at least one ester made from:
   A. at least one high molecular weight carboxylic acid reagent prepared by reaction of (1) a low molecular weight, ethylenically unsaturated carboxylic acid reagent with (2) an oxidized, degraded ethylene-propylene interpolymer having a molecular weight of at least 700 and obtained by heating a higher molecular weight ethylene-propylene interpolymer at a temperature of at least 100° C. in the presence of oxygen to cause reduction of at least about 5% in the molecular weight of said interpolymer, and
   B. at least one mono- or polyhydric alcohol of the formula

   $R(OH)_n$ wherein R is a hydrocarbon-based group of one to about forty carbon atoms and n is one to about six.

2. A composition as claimed in claim 1, wherein the oxidized, degraded ethylene-propylene interpolymer is obtained by heating a high molecular weight ethylene-propylene interpolymer at a temperature of at least about 100° C. to about 350° C.

3. A composition of matter as claimed in claim 2, wherein the low molecular weight, ethylenically unsaturated carboxylic acid reagent is at least one acrylic acid reagent, methacrylic acid reagent or maleic acid reagent.

4. A composition of matter as claimed in claim 3, wherein the low molecular weight, ethylenically unsaturated carboxylic acid reagent is maleic anhydride.

5. A composition of matter as claimed in claim 1, wherein the alcohol (B) is a polyhydric, aliphatic-based alcohol of at least three hydroxyl groups and up to about twelve aliphatic carbon atoms.

6. A composition of matter as claimed in claim 5, wherein the low molecular weight, ethylenically unsaturated carboxylic acid reagent is maleic anhydride.

7. A composition of matter as claimed in claim 6, wherein the alcohol (G) is a polyhydric lower alkanol having from 3 to 6 hydroxyl groups and 3 to 7 carbon atoms.

8. A lubricant composition comprising a major amount of oil and a viscosity improving or sludge dispersing amount of at least one composition as claimed in claim 1.

9. A lubricant composition comprising a major amount of oil and a viscosity improving or sludge dispersing amount of at least one composition as claimed in claim 2.

10. A lubricant composition comprising a major amount of oil and a viscosity improving or sludge dispersing amount of at least one composition as claimed in claim 3.

11. A lubricant composition comprising a major amount of oil and a viscosity improving or sludge dispersing amount of at least one composition as claimed in claim 4.

12. A lubricant composition comprising a major amount of oil and a viscosity improving or sludge dispersing amount of at least one composition as claimed in claim 5.

13. A lubricant composition comprising a major amount of oil and a viscosity improving or sludge dispersing amount of at least one composition as claimed in claim 6.

14. A lubricant composition comprising a major amount of oil and a viscosity improving or sludge dispersing amount of at least one composition as claimed in claim 7.

15. An additive concentrate for treatment of lubricants and normally liquid fuels comprising about 20 to 90% of the composition of claim 1.

16. An additive concentrate for treatment of lubricants and normally liquid fuels comprising about 20 to 90% of the composition claimed in claim 2.

17. An additive concentrate for treatment of lubricants and normally liquid fuels comprising about 20 to 90% of the composition claimed in claim 3.

18. An additive concentrate for treatment of lubricants and normally liquid fuels comprising about 20 to 90% of the composition claimed in claim 4.

19. An additive concentrate for treatment of lubricants and normally liquid fuels comprising about 20 to 90% of the composition claimed in claim 5.

20. An additive concentrate for treatment of lubricants and normally liquid fuels comprising about 20 to 90% of the composition claimed in claim 6.

21. An additive concentrate for treatment of lubricants and normally liquid fuels comprising about 20 to 90% of the composition claimed in claim 7.

22. A normally liquid fuel composition comprising a major amount of normally liquid fuel and a sludge dispersing amount of at least one composition of matter comprising at least one ester made from:
   A. at least one high molecular weight carboxylic acid reagent prepared by reaction of (1) a low molecular weight, ethylenically unsaturated carboxylic acid reagent with (2) an oxidized, degraded ethylene-propylene interpolymer having a molecular weight of at least 700 and obtained by heating a higher molecular weight ethylene-propylene interpolymer at a temperature of at least 100° C. in the presence of oxygen to cause a reduction of at least about 5% in the molecular weight of said interpolymer, and
   B. at least one mono- or polyhydric alcohol of the formula $$R(OH)_n$$

wherein R is a hydrocarbon-based group of one to about forty carbon atoms and $n$ is one to about six.

23. A composition as claimed in claim 22, wherein the oxidized, degraded ethylene-propylene interpolymer is obtained by heating a high molecular weight ethylene-propylene interpolymer at a temperature of at least about 100° C. to about 350° C.

24. A composition of matter as claimed in claim 23, wherein the low molecular weight, ethylenically unsaturated carboxylic acid reagent is at least one acrylic acid reagent, methacrylic acid reagent or maleic acid reagent.

25. A composition of matter as claimed in claim 24, wherein the low molecular weight, ethylenically unsaturated carboxylic acid reagent is maleic anhydride.

26. A composition of matter as claimed in claim 22, wherein the alcohol (B) is a polyhydric, aliphatic-based alcohol of at least three hydroxyl groups and up to about twelve aliphatic carbon atoms.

27. A composition of matter as claimed in claim 26 wherein the low molecular weight, ethylenically unsaturated carboxylic acid reagent is maleic anhydride.

28. A composition of matter as claimed in claim 27, wherein the alcohol (B) is a polyhydric lower alkanol having from 3 to 6 hydroxyl groups and 3 to 7 carbon atoms.

* * * * *